United States Patent
Zhao et al.

(10) Patent No.: US 11,368,920 B2
(45) Date of Patent: Jun. 21, 2022

(54) METHOD AND APPARATUS FOR DYNAMICALLY ADJUSTING SAR VALUE, MOBILE TERMINAL, AND COMPUTER STORAGE MEDIUM

(71) Applicant: ONEPLUS TECHNOLOGY (SHENZHEN) CO., LTD., Guangdong (CN)

(72) Inventors: Xing Zhao, Guangdong (CN); Jiayu Ding, Guangdong (CN)

(73) Assignee: ONEPLUS TECHNOLOGY (SHENZHEN) CO., LTD., Guangdong (CN)

(*) Notice: Subject to any disclaimer, the term of this patent is extended or adjusted under 35 U.S.C. 154(b) by 0 days.

(21) Appl. No.: 17/353,299

(22) Filed: Jun. 21, 2021

(65) Prior Publication Data

US 2021/0314876 A1    Oct. 7, 2021

Related U.S. Application Data

(63) Continuation of application No. PCT/CN2019/126981, filed on Dec. 20, 2019.

(30) Foreign Application Priority Data

Dec. 20, 2018   (CN) .......................... 201811562818.7

(51) Int. Cl.
*H04W 52/18*   (2009.01)
*H04W 76/10*   (2018.01)
(Continued)

(52) U.S. Cl.
CPC .......... *H04W 52/18* (2013.01); *H04W 24/08* (2013.01); *H04W 52/38* (2013.01); *H04W 76/10* (2018.02);
(Continued)

(58) Field of Classification Search
CPC . H04W 52/18; H04W 52/38; H04W 52/0209; H04W 24/08; H04W 76/10; H04W 84/12
(Continued)

(56) References Cited

U.S. PATENT DOCUMENTS 8,538,351 B2 * 9/2013 Wilson ................ H04W 52/228
455/127.1
8,774,853 B2 * 7/2014 Wilson ................ H04W 52/228
455/522

(Continued)

FOREIGN PATENT DOCUMENTS

CN       104301982 A       1/2015
CN       108462500 A       8/2018
(Continued)

OTHER PUBLICATIONS

Written Opinion of the International Search Authority in the international application No. PCT/CN2019/126981, dated Mar. 10, 2020.

(Continued)

*Primary Examiner* — Hai V Nguyen
(74) *Attorney, Agent, or Firm* — Ladas & Parry LLP (57) ABSTRACT

Disclosed are a method and apparatus for dynamically adjusting an SAR value, a mobile terminal, and a computer storage medium. The method for dynamically adjusting the SAR value is applied to the mobile terminal. The mobile terminal comprises a WiFi antenna used for connecting a WiFi network. The method comprises: monitoring the change of a cell or the change of a network type of the mobile terminal; when monitoring the change of the cell or the change of the network type of the mobile terminal, obtaining a working frequency band on which the mobile terminal currently camps; and adjusting the transmit power of the WiFi antenna according to a difference value between (Continued)

a pre-stored SAR value corresponding to the working frequency band and an SAR standard value.

12 Claims, 6 Drawing Sheets (51) Int. Cl.
*H04W 24/08* (2009.01)
*H04W 52/38* (2009.01)
*H04W 52/02* (2009.01)
*H04W 84/12* (2009.01)

(52) U.S. Cl.
CPC ........ *H04W 52/0209* (2013.01); *H04W 84/12* (2013.01)

(58) Field of Classification Search
USPC .................................................. 455/522, 69
See application file for complete search history.

(56) References Cited

U.S. PATENT DOCUMENTS

| | | | | |
|---|---|---|---|---|
| 9,307,505 | B2* | 4/2016 | Zhu | H04W 52/367 |
| 9,426,754 | B2* | 8/2016 | Steer | H04W 52/288 |
| 9,749,878 | B2* | 8/2017 | Zhu | H04W 52/38 |
| 9,992,753 | B2* | 6/2018 | Zhu | H04W 52/0229 |
| 10,070,390 | B2* | 9/2018 | Patel | H04W 52/0248 |
| 10,136,384 | B1* | 11/2018 | Mauer | H04L 49/90 |
| 10,506,592 | B2* | 12/2019 | Chrisikos | H04W 72/1215 |
| 10,652,833 | B2* | 5/2020 | Nadakuduti | H04W 52/38 |
| 10,804,947 | B2* | 10/2020 | Hussein | H04B 1/3838 |
| 11,006,373 | B2* | 5/2021 | Han | H04W 52/242 |
| 2012/0270592 | A1 | 10/2012 | Ngai | |
| 2013/0252658 | A1* | 9/2013 | Wilson | H04W 52/246 455/522 |
| 2014/0128032 | A1* | 5/2014 | Muthukumar | H04W 52/0254 455/412.2 |
| 2014/0274179 | A1* | 9/2014 | Zhu | H04W 52/30 455/509 |
| 2014/0274190 | A1 | 9/2014 | Lu et al. | |
| 2014/0370830 | A1* | 12/2014 | Steer | H04W 52/288 455/127.1 |
| 2015/0036514 | A1* | 2/2015 | Zhu | H04W 52/38 370/252 |
| 2016/0098053 | A1 | 4/2016 | Khawand et al. | |
| 2016/0157187 | A1* | 6/2016 | Zhu | H04W 52/0229 370/311 |
| 2018/0288710 | A1 | 10/2018 | Luo et al. | |
| 2018/0309467 | A1 | 10/2018 | Sun | |
| 2019/0020097 | A1* | 1/2019 | Chang | H01Q 1/243 |
| 2019/0165824 | A1* | 5/2019 | Mohamed | H04B 1/3838 |
| 2019/0268906 | A1* | 8/2019 | Perdomo | G01S 19/13 |
| 2020/0015171 | A1* | 1/2020 | Nadakuduti | H04W 52/225 |
| 2020/0112927 | A1* | 4/2020 | Han | H04W 72/1205 |
| 2020/0178181 | A1 | 6/2020 | Luo et al. | |
| 2021/0058918 | A1* | 2/2021 | Zhou | H04W 52/367 |
| 2021/0127337 | A1* | 4/2021 | Nadakuduti | H04W 52/367 |

FOREIGN PATENT DOCUMENTS

| | | |
|---|---|---|
| CN | 109495120 A | 3/2019 |
| EP | 2779738 A1 | 9/2014 |
| WO | 2018068709 A1 | 4/2018 |

OTHER PUBLICATIONS

First Office Action of the Chinese application No. 201811562818.7, dated Mar. 4, 2020.
Notice of Allowance of the Chinese application No. 201811562818.7, dated Sep. 2, 2020.
Search report with an English translation dated Mar. 10, 2020 for Application No. PCT/CN2019/126981.
Espacenet English abstract for CN 109495120 A.
Espacenet English abstract for CN 108462500 A.
Supplementary European Search Report in the European application No. 19898451.0, dated Feb. 3, 2022,.
Office Action of the Indian application No. 202117032424, dated Mar. 11, 2022.

* cited by examiner

METHOD AND APPARATUS FOR DYNAMICALLY ADJUSTING SAR VALUE, MOBILE TERMINAL, AND COMPUTER STORAGE MEDIUM

CROSS-REFERENCE TO RELATED APPLICATION

This application is a continuation application of International Patent Application No. PCT/CN2019/126981, entitled "METHOD AND APPARATUS FOR DYNAMICALLY ADJUSTING SAR VALUE, MOBILE TERMINAL, AND COMPUTER STORAGE MEDIUM" filed on Dec. 20, 2019, which claims priority to Chinese Patent Application No. 201811562818.7, filed on Dec. 20, 2018 and entitled "METHOD AND APPARATUS FOR DYNAMICALLY ADJUSTING SAR VALUE, MOBILE TERMINAL AND COMPUTER STORAGE MEDIUM", the contents of which are incorporated herein by reference in their entirety.

BACKGROUND

In 1990, the Institute of Electrical and Electronics Engineers (IEEE) formulated a technical standard for measuring the electromagnetic radiation of the terminal. In 1998, International Commission for Non-Ionizing Radiation Protection (ICNIRP) developed similar technical standard in which the Specific Absorption Rate (SAR) is adopted to measure the magnitude of the electromagnetic radiation of the terminal. The ICNIRP standard is recommended by the International Telecommunication Union and the World Health Organization and supported by most countries, while North America adopts the IEEE standard.

There is a relatively complete measuring standard in the international scientific community for the radiation level of the mobile phone, namely SAR value. The SAR currently talked about internationally is for the radiation generated by cellular mobile phones (commonly referred to as cell phones). The SAR value, i.e., the Specific Absorption Rate, represents the amount of radiation allowed to be absorbed per kilogram of organism including human body. The SAR value represents the effect of radiation on human body, and is the most direct test value. The SAR has data for whole body, part of body, and extremities. The lower the SAR value, the less the radiation is absorbed. Herein the SAR standard value for the brain area must be lower than 1.67 watts for safety.

When the mobile phone makes a call, sends a message, and accesses the Internet with data, all the cellular antennas used in the cellular network generate radiation. When the mobile phone accesses the Internet with Wireless Fidelity (Wi-Fi), the Wi-Fi antenna of the mobile phone also generates radiation. The final SAR value of the mobile phone is the sum of the two superposition values. In the related art, the "one size fits all" solution is used to meet the requirements of the SAR standard value.

If the mobile phone supports multiple network standards, and each network standard may include different frequency bands, since the SAR values corresponding to each frequency band of each network standard may be different, the so-called "one size fits all" is calculating the maximum difference value between the SAR value within each frequency band and the SAR standard value for each frequency band of different network standards, and reducing the transmission power of the Wi-Fi antenna of the mobile phone within any frequency band with the maximum difference value, so that the mobile phone can meet the SAR standard value requirements at any time. It is apparent that, for those frequency bands whose difference value with the SAR standard value is smaller than the maximum difference value, since the transmission power of the Wi-Fi antenna may be excessively reduced, a situation such as a slow network speed and a poor signal may occur in the mobile phone, thereby reducing the performance of the mobile phone and the like.

SUMMARY

Technical Field

The present disclosure relates to the technical field of electromagnetic radiation of the terminal, and more particularly, to a method and device for dynamically adjusting the SAR value, a mobile terminal, and a computer storage medium.

According to at least some embodiments, there is provided a method for dynamically adjusting the SAR value. The method is applied to a mobile terminal, and the mobile terminal includes a Wi-Fi antenna for connecting to a Wi-Fi network, the method includes: monitoring a cell change or a network standard change of the mobile terminal; in response to that the cell change or the network standard change is monitored, acquiring an operating frequency band in which the mobile terminal currently camps; and adjusting the transmission power of the Wi-Fi antenna according to the difference value between the pre-stored SAR value corresponding to the operating frequency band and the SAR standard value.

According to at least some embodiments, there is provided a mobile terminal, including an application chip, a baseband chip, a Wi-Fi assembly, and a Wi-Fi antenna for connecting to a Wi-Fi network. Herein the application chip and the Wi-Fi assembly are both connected to the baseband chip, and the Wi-Fi assembly is connected to the Wi-Fi antenna. The application chip is configured to monitor the cell change or the network standard change of the mobile terminal from the baseband chip. In response to that the cell change or the network standard change is monitored, the application chip is configured to acquire, from the baseband chip, the operating frequency band in which the mobile terminal currently camps. The application chip is configured to notify the baseband chip to control the Wi-Fi assembly to adjust the transmission power of the Wi-Fi antenna according to the difference value between the pre-stored SAR value corresponding to the operation frequency band and the SAR standard value.

According to at least some embodiments, there is provided a computer storage medium storing the computer program that, when executed, cause to implement the above-described method for dynamically adjusting the SAR value.

BRIEF DESCRIPTION OF THE DRAWINGS

In order to describe the technical solutions of the embodiments of the disclosure more clearly, the drawings required to be used in the embodiments will be simply introduced below. It is to be understood that the following drawings only illustrate some embodiments of the disclosure and thus should not be considered as limits to the scope.

REFERENCE SIGNS OF MAIN ELEMENTS

100—mobile phone; 110—Radio Frequency (RF) circuit; 120—memory; 130—input unit; 140—display unit; 150—camera unit; 160—audio circuit; 170—Wi-Fi assembly; 180—processor; 190—power supply; 200—Wi-Fi antenna; 210—application chip; 220—baseband chip; 1—device for dynamically adjusting the SAR value; 10—monitoring module; 20—frequency band acquiring module; and 30—power adjusting module.

DETAILED DESCRIPTION

The technical solutions in the embodiments of the disclosure will be clearly and completely described below in combination with the drawings in the embodiments of the disclosure. It is apparent that the described embodiments are not all embodiments but only part of embodiments of the disclosure.

The components, described and illustrated in the drawings, of the embodiments of the disclosure may usually be arranged and designed with various configurations. Therefore, the following detailed descriptions about the embodiments of the disclosure in the drawings are not intended to limit the scope of the disclosure but only represent selected embodiments of the disclosure. All other embodiments obtained by those skilled in the art based on the embodiments of the disclosure without creative work shall fall within the scope of protection of the disclosure.

Figure 1:
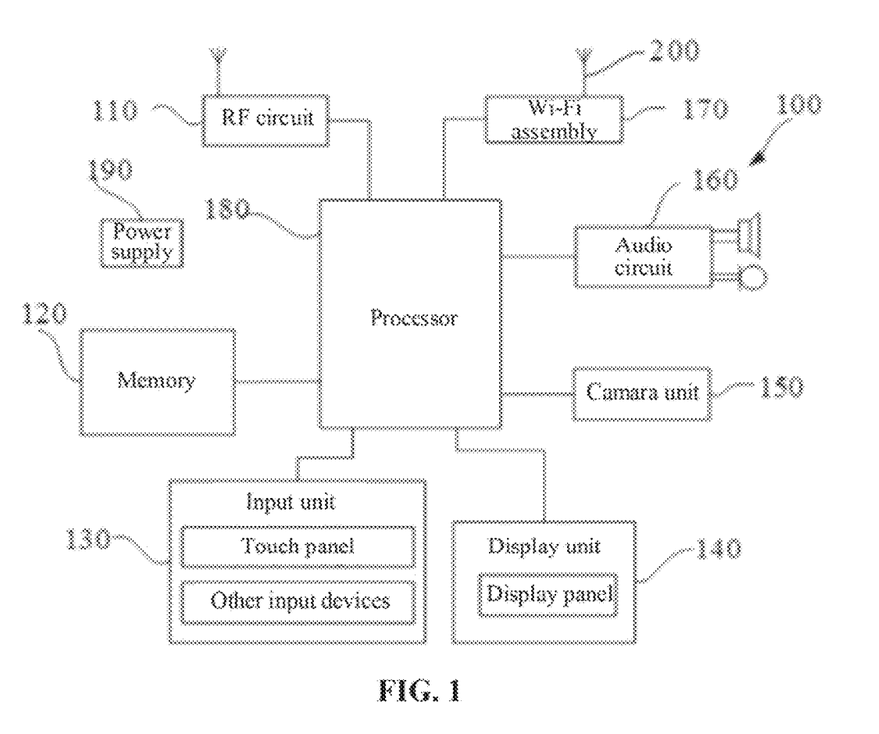
FIG. 1 is a structure diagram of a mobile terminal according to an embodiment of the present disclosure.

Each of the following embodiments can be applied to a mobile terminal as illustrated in FIG. 1, such as a mobile phone. FIG. 1 illustrates a structure block diagram of the mobile phone. The mobile phone 100 includes a RF circuit 110, a memory 120, an input unit 130, a display unit 140, a camera unit 150, an audio circuit 160, a Wi-Fi assembly 170, a processor 180, and a power supply 190 and the like. Herein, the RF circuit 110 may be used to receive and transmit the wireless signals, etc. The memory 120 may be used to store the application programs and the related file information of the user required for the running of the mobile phone 100. The input unit 130 may include a keypad, a touch panel, and other input devices for receiving the information from the user input or the like. The display unit 140 may include a display panel mainly for displaying the information of pictures and texts and the like. The camera unit 150 mainly includes a front-and-back camera, and is mainly used for photographing pictures, videos and the like. The audio circuit 160 may be connected to a speaker or the like for playing the voice. The Wi-Fi assembly 170 is connected to the Wi-Fi antenna 200 for transmitting and receiving the Wi-Fi signals to implement the information transmission. The processor 180 serves as a control processing center of the mobile phone 100, and is mainly used to enable other units or modules to perform corresponding functions. For a smartphone, the processor 180 mainly includes an application processor and a baseband processor. The power supply 190 mainly includes a battery device for supplying the required operating voltage to each module or unit in the mobile phone 100.

It is to be understood by those skilled in the art that the structure of the mobile phone 100 illustrated in FIG. 1 is not construed as the limitation of the mobile phone, and may include components more or less than those illustrated in the drawings, or combine certain components, or include different component arrangements. The technical solution of the present disclosure is described below by taking the mobile phone as an example. Of course, the present disclosure is not limited to be applied to a mobile phone, but can also be applied to a talkable tablet computer or the like.

In order to make the mobile terminal meet the SAR standard value requirement, the "one size fits all" solution is currently adopted. That is, when the mobile phone camps on the cellular network and is connected to the Wi-Fi network at the same time, the transmission power of the Wi-Fi antenna is reduced by using the maximum difference value between the SAR value within each frequency band and the SAR standard value. Herein, the mobile terminal is generally required to pass the SAR value test before the delivery, i.e., detecting whether the radiation value corresponding to each operating frequency band supported by the mobile terminal satisfy the SAR value standard.

Figure 2:
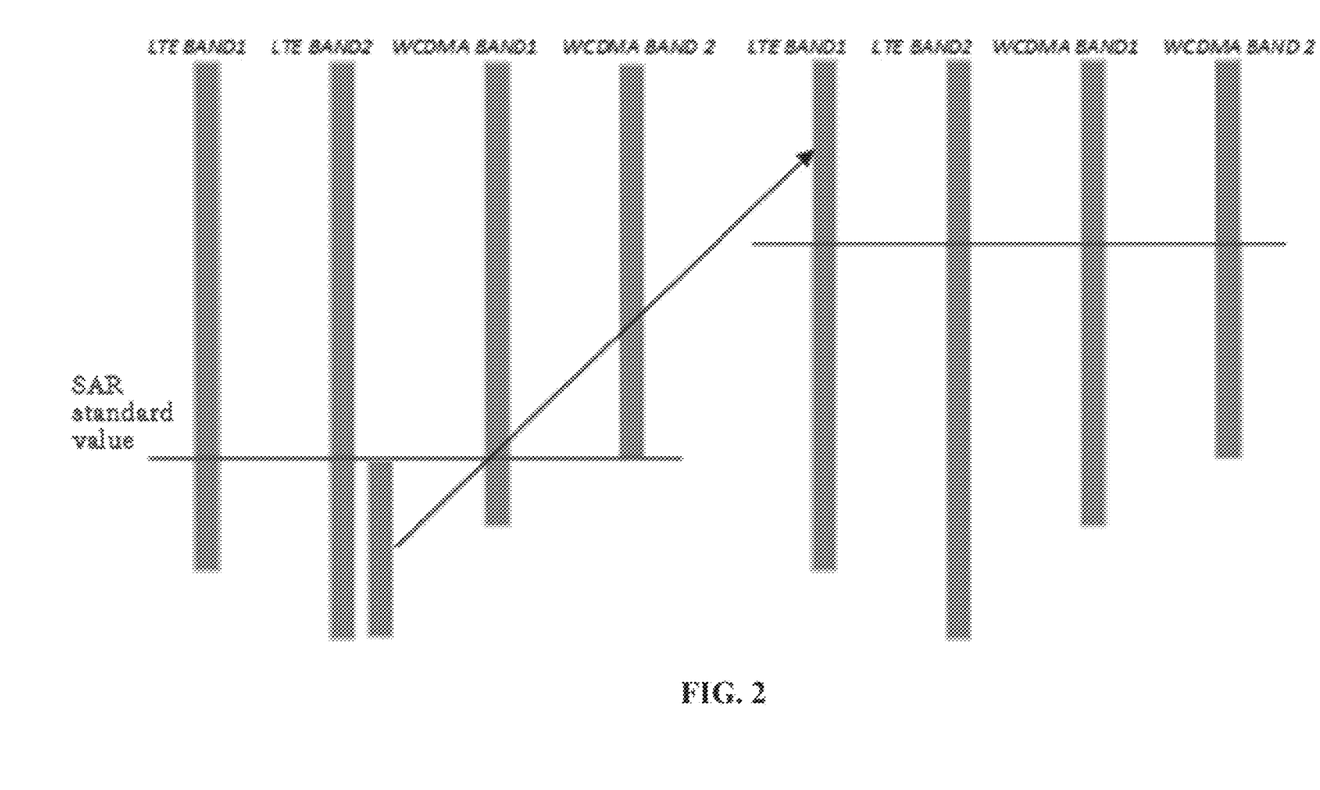
FIG. 2 is a diagram of the SAR value processing in the related art.

As illustrated in FIG. 2, if the mobile phone supports LTE BAND 1, LTE BAND 2, WCDMA BAND1, and WCDMA BAND 2, in order that the SAR value within each frequency band does not exceed the SAR standard value, it can be learned from the SAR value test before the delivery that the transmission power value to be reduced is 5 db when the mobile phone camps in the LTE BAND 1 frequency band, the transmission power value to be reduced is 8 db when the mobile phone camps in the LTE BAND 2 band, the transmission power value to be reduced is 3 db when the mobile phone camps in the WCDMA BAND 1 band, and the transmission power value to be reduced is 0 db when the mobile phone camps in the WCDMA BAND2 band. Therefore, according to the maximum value reduction principle, 8 db will be used as the transmission power reduction value for all frequency bands. In other words, the conventional solution does not distinguish the current operating frequency band in which the mobile phone camps, and the transmission power of the Wi-Fi antenna is always reduced by 8 db for any operating frequency band, so as to ensure that the SAR standard value requirements can be met for any frequency band in which the mobile phone camps.

It is apparent that if the conventional "one size fits all" principle is adopted, an excessive decrease of the SAR value may occur in the frequency bands such as WCDMA BAND 1 and WCDMA BAND2. Since the larger the decrease value is, the smaller the transmission power of the antennas is, and the decreasing of the transmission power will cause the degradation of the performance of the mobile phone, the situation such as slow network speed and poor signal will occur.

Figure 3:
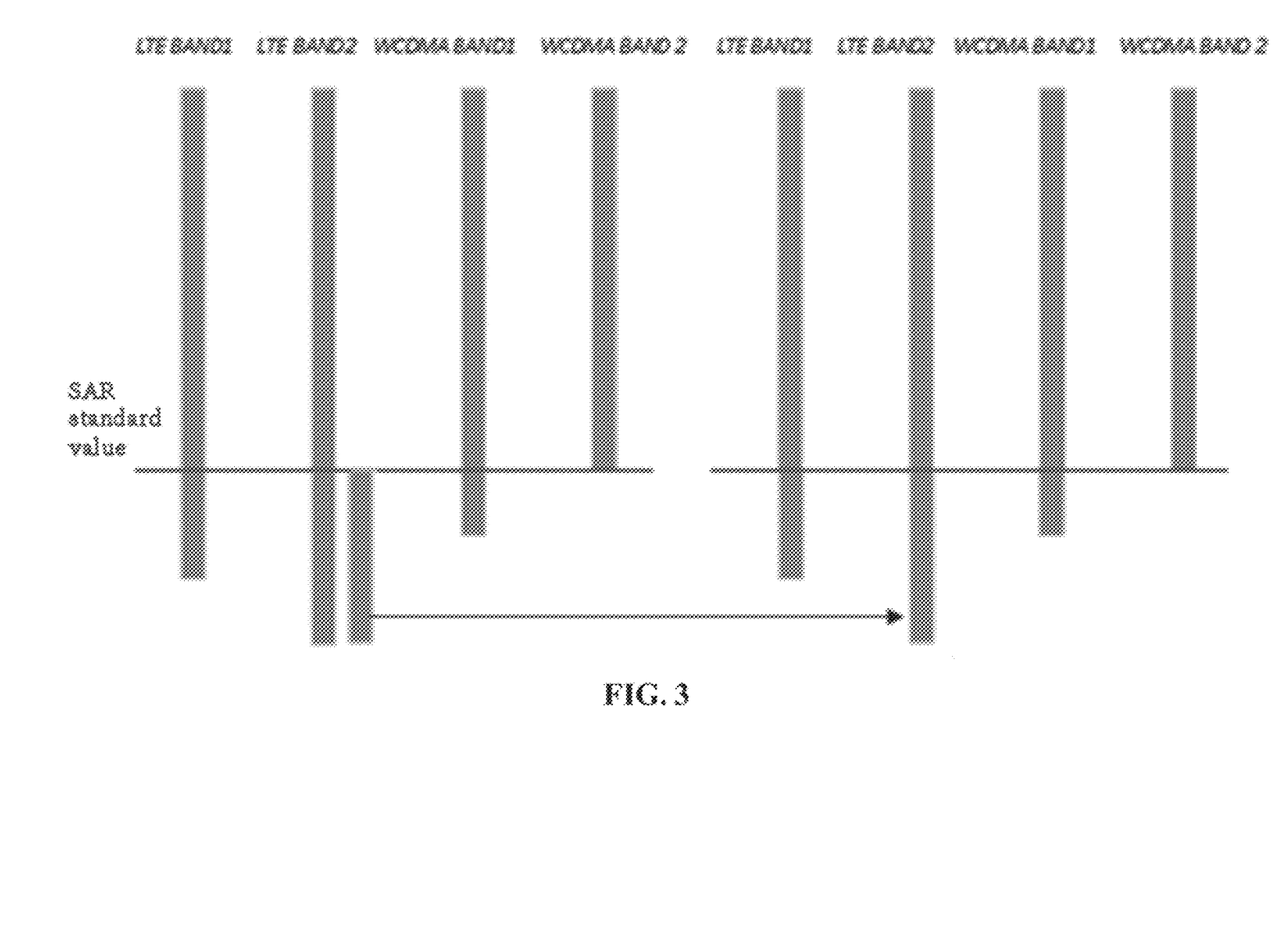
FIG. 3 is a diagram of the SAR value processing according to an embodiment of the present disclosure.

In view of the above, the present disclosure provides a method for dynamically adjusting the SAR value. The frequency band in which the mobile terminal currently camps is actively acquired by establishing an operating frequency band acquisition channel, and the transmission power of the Wi-Fi antenna is dynamically adjusted according to the different frequency bands. As illustrated in FIG. 3, according to the technical solution of the present disclosure, the transmission power is only needed to be reduced by 5 db when the mobile phone camps within the frequency band of LTE BAND 1. The transmission power is only needed to be reduced by 8 db when the mobile phone camps within the frequency band of LIE BAND2. The transmission power is only needed to be reduced by 3 db when the mobile phone camps within the frequency band of WCDMA BAND 1. There is no need to reduce the transmission power when the mobile phone camps within the frequency band of WCDMA BAND2. It can be seen that the SAR value within each frequency band is reasonably adjusted by adopting the dynamic adjustment mode, and the performance of the mobile terminal is optimized within each frequency band.

The present disclosure is described in terms of specific embodiments, although the present disclosure is not limited to these specific embodiments.

First Embodiment

Figure 4:
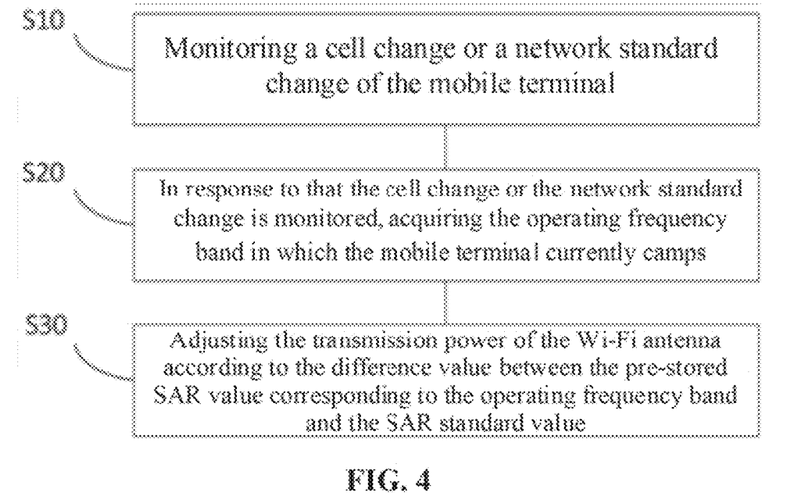
FIG. 4 is a first flow chart of a method for dynamically adjusting the SAR value according to an embodiment of the present disclosure.

Referring to FIG. 4, the present disclosure provides a method for dynamically adjusting the SAR value, which can be applied to a mobile terminal such as a mobile phone or a tablet computer having the cellular communication function. Herein the mobile terminal includes a Wi-Fi antenna for connecting to the Wi-Fi network. The method for dynamically adjusting the SAR value is described in detail below.

In step S10, a cell change or a network standard change of the mobile terminal is monitored.

In step S20, in response to that the cell change or the network standard change is monitored, the operating frequency band in which the mobile terminal currently camps is acquired.

In this embodiment, the real-time change of the operating frequency band in which the mobile terminal camps may be acquired by actively monitoring the change of the network standard or the cell change of the mobile terminal.

In step S10, since the frequency bands corresponding to different network standards are different, when the type of the network i.e., the network standard) to which the mobile terminal is connected changes, it indicates that the operating frequency band in which the mobile terminal camps changes. In this case, step S20 will be performed. That is, the information of the operating frequency band in which the mobile terminal currently camps is acquired.

Herein the cell change refers to the change of the cellular cell of the mobile terminal. When the mobile terminal moves from one cellular cell to another, the mobile terminal will perform cell handover. Since the frequency bands of different cells may be same or different, if the cell change is monitored, step S20 will also be performed to further confirm whether the operating frequency band in which the mobile terminal camps changes.

Accordingly, when either of the two changes is monitored, the operating frequency band in which the mobile terminal currently camps will be actively acquired, and step S30 will be performed. That is, the SAR value is dynamically adjusted according to the operating frequency band in which the terminal currently camps.

In step S30, the transmission power of the Wi-Fi antenna is adjusted according to the difference value between the pre-stored SAR value corresponding to the operating frequency band and the SAR standard value.

In this embodiment, the SAR values corresponding to the operating frequency bands supported by the mobile terminal may be pre-acquired by the SAR value test and then stored in a SAR value reference table. Of course, the SAR value reference table may also store the difference value between the SAR value corresponding to each operating frequency band and the SAR standard value, or directly store the power adjustment value corresponding to the difference value between the SAR value corresponding to each operating frequency band and the SAR standard value, or the like.

In step S30, after the operating frequency band of the mobile terminal is acquired, the adjustment value of the transmission power of the Wi-Fi antenna can be determined according to the operating frequency band and the SAR reference table.

Optionally, when the cell change of the mobile terminal is detected, if it is determined that the currently camped operating frequency band is the same as that of the previously camped operating frequency band, it indicates that the frequency band of the switched cell is the same as that of the previous cell. In this case, after switching to the current cell, the transmission power of the Wi-Fi antenna of the currently camped operating frequency band is no longer adjusted. That is, the difference value between the pre-stored SAR value corresponding to the current operating frequency band and the SAR standard value will not be calculated. Instead, the terminal will continue to work according to the transmission power of the Wi-Fi antenna adjusted in the previous cell. For example, if the operating frequency band in which the previous cell is located is frequency band 1 and the corresponding power adjustment value is 3 db, when switching to the another cell with the operating frequency band is also frequency band 1, the transmission power of the Wi-Fi antenna within the current operating frequency band will not be re-adjusted. Then, the transmission power of the Wi-Fi antenna is continuously adjusted according to the adjustment value 3 db corresponding to the previous cell.

For the mobile terminal, when there are multiple cellular antennas, a primary antenna will be selected therefrom, and the signal received by the primary antenna is used as the main signal, while other antennas serve as auxiliary antennas for assisting in improving the signal quality. When there are multiple cellular antennas, the position of the primary antenna can be dynamically switched according to the strength of the signal. Since the SAR value is the result of the superposition of the two types of network, the actual SAR value of the mobile terminal will also be affected when the position of the primary antenna connected to the cellular network is switched.

Figure 5:
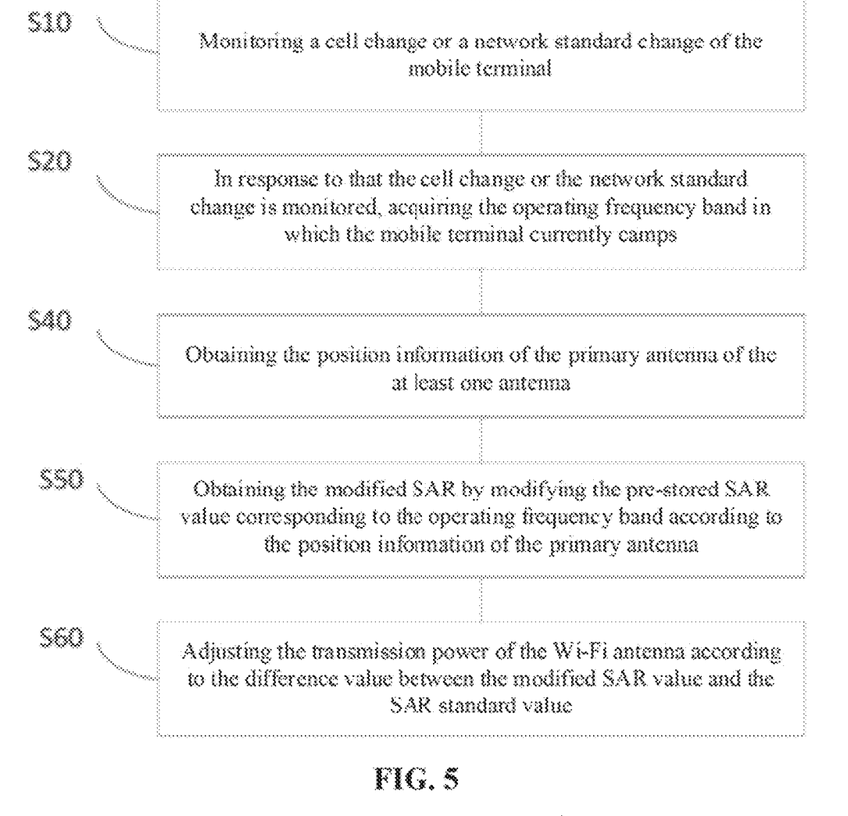
FIG. 5 is a second flow chart of a method for dynamically adjusting the SAR value according to an embodiment of the present disclosure.

Further, as illustrated in FIG. 5, when the mobile terminal further includes at least one antenna for connecting to the cellular network, the method may further include steps S40-S60.

In step S40, the position information of the primary antenna of the at least one antenna is obtained.

In order to obtain a more accurate power adjustment value to further improve the performance of the terminal, after the cell change or the network standard change is monitored, the position information of the primary antenna of the mobile terminal is also obtained while obtaining the operating frequency band in which the mobile terminal currently camps, and the final power adjustment value of the Wi-Fi antenna is determined according to the operating frequency band and the position information of the primary antenna.

In step S50, the modified SAR is obtained by modifying the pre-stored SAR value corresponding to the operating frequency band according to the position information of the primary antenna.

In step S60, the transmission power of the Wi-Fi antenna is adjusted according to the difference value between the modified SAR value and the SAR standard value.

Figure 6:
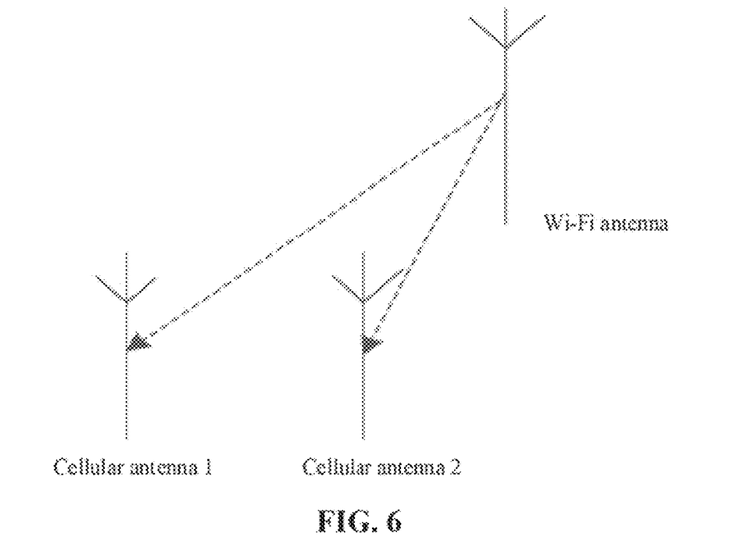
FIG. 6 is a diagram of the application of a method for dynamically adjusting the SAR value according to an embodiment of the present disclosure.

Exemplarily, the position information of the primary antenna may include numbering information of the corresponding cellular antenna. For example, as illustrated in FIG. 6, if the mobile terminal has two cellular antennas at the same time, their numbers are 1 and 2, respectively, and the distance from the antenna 1 to the Wi-Fi antenna is greater than the distance from the antenna 2 to the Wi-Fi antenna. Then, if the primary antenna is antenna 1 at this time, after the pre-stored SAR value corresponding to the current operating frequency band is acquired according to the current operating frequency band, the SAR value may be appropriately reduced to obtain a smaller power adjustment value. That is, the power adjustment value may be appropriately reduced with respect to the power adjustment value corresponding to the pre-stored SAR value. If the primary antenna is antenna 2 at this time, the SAR value may be appropriately increased to obtain a power adjustment value larger than the power adjustment value corresponding to the pre-stored SAR value.

It is to be understood that when the distance between the primary antenna and the Wi-Fi antenna is relatively far compared to the predetermined distance or the distance of other cellular antennas, the power adjustment value is appropriately reduced. When the distance between the primary antenna and the Wi-Fi antenna is relatively close, the power adjustment value is appropriately increased. A more accurate power adjustment value can be obtained by correspondingly modifying the SAR value in combination with the position relationship between the primary antenna and the Wi-Fi antenna, so that the transmission power of the Wi-Fi antenna is more matched, and the performance of the mobile terminal is further improved. Of course, after the transmission power is more matched, the power consumption of the system can also be reduced.

In this embodiment, the network standard may include, but is not limited to, at least one of a 2G network, a 3G network, or a 4G network. For example, the 2G network may include GSM mode. The 3G network may include a WCDMA mode, a TD-SCDMA mode, or the like. The 4G network may include TDD-LTE mode, FDD-TLE mode, or the like. Further, the modes described above may also include multiple frequency bands.

According to the dynamic adjustment of SAR value proposed in this embodiment, the operating frequency band in which the mobile terminal currently camps is actively acquired, and the transmission power of the Wi-Fi antenna of the mobile terminal is correspondingly adjusted according to different camped operating frequency bands, so that the dynamic adjustment of the SAR value can be implemented, the problem of adjusting the SAR value with a fixed value for all frequency bands in the related art is overcome, and the performance of the mobile terminal is improved. In addition, it is also considered that when there are multiple cellular antennas, the SAR value is further modified according to the position information of the primary antenna, so that the performance of the mobile terminal can be further improved.

Second Embodiment

Figure 7:
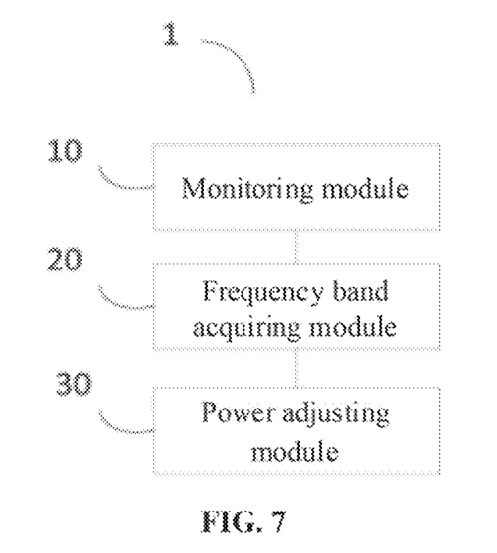
FIG. 7 is a structure diagram of a device for dynamically adjusting the SAR value according to an embodiment of the present disclosure.

Referring to FIG. 7, the present embodiment provides a device 1 for dynamically adjusting the SAR value. The device is applied to a mobile terminal. The mobile terminal includes a Wi-Fi antenna for connecting to a Wi-Fi network, the device 1 for dynamically adjusting the SAR value includes:

a monitoring module 10, configured to monitor the network standard change or the cell change of the mobile terminal;

a frequency band acquiring module 20, configured to, in response to that the cell change or the network standard change is monitored, acquire the operating frequency band in which the mobile terminal currently camps; and a power adjusting module 30, configured to adjust the transmission power of the Wi-Fi antenna according to the difference value between the pre-stored SAR value corresponding to the operating frequency band and the SAR standard value.

The above-mentioned device 1 for dynamically adjusting the SAR value corresponds to the method for dynamically adjusting the SAR value of the First Embodiment.

Further, the mobile terminal further includes at least one antenna for connecting to the cellular network. The device further includes:

a first acquiring unit, configured to obtain the position information of the primary antenna of the at least one antenna; and a second obtaining unit, configured to obtain the modified SAR value by modifying the pre-stored SAR value according to the position information.

The adjustment unit is further configured to adjust the transmission power of the Wi-Fi antenna according to the difference value between the modified SAR value and the SAR standard value.

Further, the device further includes:

a processing unit, configured to, in response to that the cell change is monitored, when the operating frequency band in which the mobile terminal currently camps is the same as the operating frequency band in which the mobile terminal previously camped, not adjust the transmission power of the Wi-Fi antenna within the operating frequency band in which the mobile terminal currently camps.

Specifically, the network standard includes at least one of a 2G network, a 3G network, or a 4G network.

It is to be understood that any alternative in the First Embodiment is also applicable to the present embodiment and will not be elaborated herein.

Third Embodiment

Figure 8:
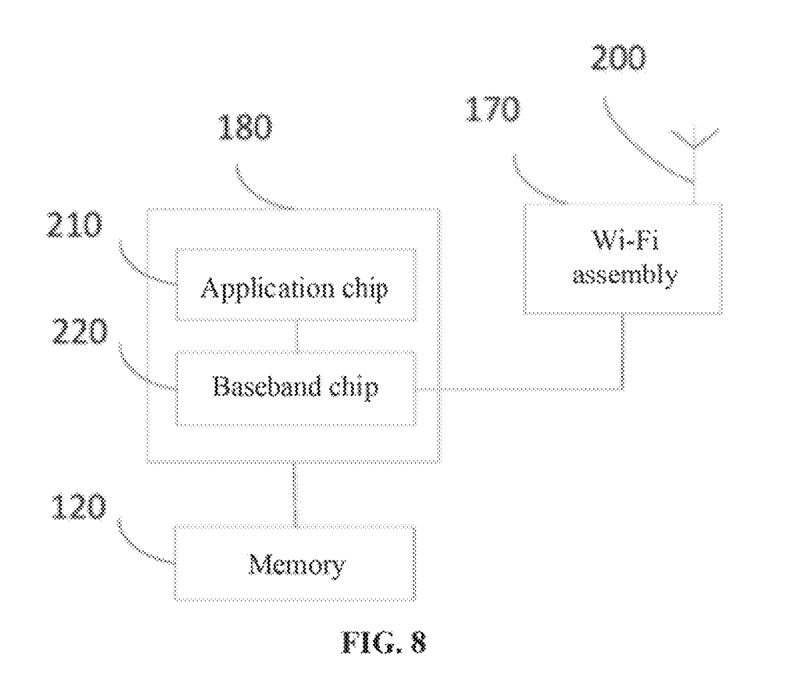
FIG. 8 is a structure diagram of a mobile terminal for dynamically adjusting the SAR value according to an embodiment of the present disclosure.

Based on the method for dynamically adjusting the SAR value in the First Embodiment or the device for dynamically adjusting the SAR value in the Second Embodiment, the present disclosure further provides a mobile terminal. The mobile terminal may include a smart phone, a tablet computer with a cellular communication function, or the like. As illustrated in FIG. 8, the mobile terminal includes a memory 120, an application chip 210, a baseband chip 220, a Wi-Fi assembly 170, and a Wi-Fi antenna 200 for connecting the Wi-Fi network. The application chip 210 and the Wi-Fi antenna 200 are both connected to the baseband chip 220, and the Wi-Fi assembly 170 is connected to the Wi-Fi antenna 200.

Specifically, the application chip 210 is configured to monitor the network standard change or the cell change of the mobile terminal from the baseband chip 220;

In response to that the cell change or the network standard change is monitored, the application chip 210 is configured to acquire, from the baseband chip 220, the operating frequency band in which the mobile terminal currently camps.

The application chip 210 is configured to instruct the baseband chip 220 to adjust the transmission power of the Wi-Fi antenna 200 according to the difference value between the pre-stored SAR value corresponding to the operating frequency band and the SAR standard value.

Further, if the mobile terminal further includes at least one antenna for connecting to the cellular network, the application chip 210 is further configured to obtain the position information of a primary antenna of the at least one antenna, and obtain the modified SAR value by modifying the pre-stored SAR value according to the position information.

The application chip 210 is further configured to instruct the baseband chip 220 to control the Wi-Fi assembly 170 to adjust the transmission power of the Wi-Fi antenna 200 according to the difference value between the modified SAR value and the SAR standard value.

Further, when the application chip 210 monitored the cell change, if the operating frequency band in which the mobile terminal currently camps is the same as the operating frequency band in which the mobile terminal previously camped, the baseband chip 220 is configured to not instruct the baseband chip 220 to control the Wi-Fi assembly 170 to adjust the transmission power of the Wi-Fi antenna 200.

Taking the mobile phone 100 as an example, as illustrated in FIG. 8, the processor of the mobile phone includes an application chip 210 and a baseband chip 220. The Wi-Fi assembly 170 is connected to the Wi-Fi antenna 200. Herein the application chip 210 is also referred to as the Application Processor (AP), and is mainly responsible for managing the application programs and the user interface on the mobile phone, and the like. The baseband chip 220 is also referred to as the Baseband Processor (BP), and is mainly responsible for the processing and storage of the communication data of the mobile phone, which includes the signal processing for the radio frequency signal, the Wi-Fi signal, and the like.

In this embodiment, a communication interface is established between the application chip 210 and the baseband chip 220 for the communication therebetween. The application chip 210 includes a Telephony module for managing cellular communication at a software level, and a Wi-Fi unit for managing the communication of the hardware Wi-Fi assembly 170.

Exemplarily, the Telephony module monitors the network standard change or the cell change of the mobile terminal from the baseband chip 220 through the communication interface described above, and acquires the operating frequency band in which the mobile terminal currently camps from the baseband chip 220 when the cell change or the network standard change is monitored.

The Wi-Fi unit instructs the baseband chip 220 to control the Wi-Fi assembly 170 of the hardware to adjust the transmission power of the Wi-Fi antenna 200 according to the difference value between the pre-stored SAR value corresponding to the operating frequency band and the SAR standard value.

Herein the memory may include a storage program area and a storage data area. Herein the storage program area may store an operating system, and an application program required by at least one function. The storage data area may store the data (such as audio data, and a telephone book, and the like) created according to the use of the mobile terminal, and the like. In addition, the memory may include high speed random access memory, and may also include non-volatile memory, such as at least one magnetic disk storage device, flash memory device, or other volatile solid state storage device.

The present disclosure further provides a computer storage medium for storing the computer program used in the mobile terminal described above.

According to at least some embodiments, the cell change or the network standard change of the mobile terminal is actively monitored, and the transmission power of the Wi-Fi antenna is adjusted according to the current operating frequency band, so that the SAR value of the mobile terminal can be dynamically adjusted within different frequency bands while satisfying the SAR standard, thereby the problem of adjusting the SAR value with a fixed value within all frequency bands in the related art is overcome, and the performance of the mobile terminal is improved.

According to at least some embodiments, the SAR value can be dynamically adjusted by adjusting the transmission power of the Wi-Fi antenna according to the current operating frequency band, thereby solving the problem that the performance degradation in a part of the operating frequency bands is caused due to the one size fits all for the SAR value in the related art.

In the several embodiments provided herein, it is to be understood that the disclosed device and method may be implemented in other ways. The device embodiments described above are merely illustrative. For example, the flow diagrams and block diagrams in the accompanying drawings illustrate architectures, functions, and operations of possible implementations of devices, methods, and computer program products according to various embodiments of the present disclosure. In this regard, each block in the flowcharts or block diagrams may represent a module, program segment, or portion of code that contain one or more executable instructions for implementing the specified logical function.

It is also to be noted that in alternative implementations, the functions marked in the blocks may also occur in an order different from that marked in the drawings. For example, two successive blocks may actually be executed substantially in parallel, and they may sometimes be executed in the reverse order, which depends on the functionality involved. It is also to be noted that each block in the block diagrams and/or flowcharts, and combinations of blocks in the block diagrams and/or flowcharts, may be implemented with a dedicated hardware-based system that performs specified functions or actions, or may be implemented with a combination of dedicated hardware and computer instructions.

In addition, the functional modules or units in the various embodiments of the present disclosure may be integrated together to form a separate part, or each module may exist alone, or two or more modules may be integrated to form a separate part.

The functions, if implemented in form of software functional modules and sold or used as separate products, may be stored in a computer-readable storage medium. Based on such an understanding, the technical solutions of the present disclosure may be embodied in form of software product, which is stored in a storage medium, including instructions for causing a computer device (which may be a smartphone, a personal computer, a server, or a network device) to perform all or a part of the steps of the methods described in the various embodiments of the present disclosure. The storage medium described above includes a USB flash drive, a removable hard disk, a Read-Only Memory (ROM), a Random Access Memory (RAM), a magnetic disk, or an optical disk.

The above is only the specific embodiments of the present disclosure, but the scope of protection of the present disclosure is not limited thereto. Variations or substitutions apparent to those skilled in the art within the technical scope disclosed by the present disclosure shall fall within the scope of protection of the present disclosure.

The invention claimed is:

1. A method for dynamically adjusting a Specific Absorption Rate (SAR) value, applied to a mobile terminal, the mobile terminal comprising a Wi-Fi antenna for connecting to a Wi-Fi network, the method comprising:
   monitoring a cell change or a network standard change of the mobile terminal;
   in response to that the cell change or the network standard change is monitored, acquiring an operating frequency band in which the mobile terminal currently camps; and
   adjusting a transmission power of the Wi-Fi antenna according to the operating frequency band and an SAR value reference table;
   wherein the SAR value reference table comprises: a pre-stored SAR value set, each pre-stored SAR value corresponding to an operating frequency of the mobile device; a difference value between a pre-stored SAR value corresponding to each operating frequency band and a SAR standard value; and a power adjustment value corresponding to the difference value between the pre-stored SAR value corresponding to each operating frequency and the SAR standard value.

2. The method for dynamically adjusting the SAR value of claim 1, wherein the mobile terminal further comprises at least one antenna for connecting to a cellular network, and the method further comprises:
   obtaining position information of a primary antenna of the at least one antenna;
   obtaining a modified SAR value by modifying the pre-stored SAR value according to the position information; and
   adjusting the transmission power of the Wi-Fi antenna according to a difference value between the modified SAR value and the SAR standard value.

3. The method for dynamically adjusting the SAR value of claim 1, further comprising:
   in response to that the cell change is monitored, when the operating frequency band in which the mobile terminal currently camps is the same as an operating frequency band in which the mobile terminal previously camped, not adjusting the transmission power of the Wi-Fi antenna within the operating frequency band in which the mobile terminal currently camps.

4. The method for dynamically adjusting the SAR value of claim 1, wherein the network standard comprises at least one of a 2nd Generation (2G) network, a 3nd Generation (3G) network, or a 4nd Generation (4G) network.

5. A mobile terminal, comprising an application chip, a baseband chip, a Wi-Fi assembly, and a Wi-Fi antenna for connecting to a Wi-Fi network; wherein the application chip and the Wi-Fi assembly are both connected to the baseband chip, and the Wi-Fi assembly is connected to the Wi-Fi antenna;
   the application chip is configured to monitor a cell change or a network standard change of the mobile terminal from the baseband chip;
   in response to that the cell change or the network standard change is monitored, the application chip is configured to acquire, from the baseband chip, an operating frequency band in which the mobile terminal currently camps; and
   the application chip is configured to notify the baseband chip to control the Wi-Fi assembly to adjust a transmission power of the Wi-Fi antenna according to the operating frequency band and an SAR value reference table;
   wherein the SAR value reference table comprises: a pre-stored SAR value set, each pre-stored SAR value corresponding to an operating frequency of the mobile device; a difference value between a pre-stored SAR value corresponding to each operating frequency band and a SAR standard value; and a power adjustment value corresponding to the difference value between the pre-stored SAR value corresponding to each operating frequency and the SAR standard value.

6. The mobile terminal of claim 5, further comprising at least one antenna for connecting to a cellular network,
   the application chip is configured to obtain position information of a primary antenna of the at least one antenna, and obtain a modified SAR value by modifying the pre-stored SAR value according to the position information; and
   the application chip is further configured to notify the baseband chip to adjust the transmission power of the Wi-Fi antenna according to a difference value between the modified SAR value and the SAR standard value.

7. The mobile terminal of claim 5, further comprising: in response to that the cell change is monitored, when the operating frequency band in which the mobile terminal currently camps is the same as an operating frequency band in which the mobile terminal previously camped, the application chip is configured to not notify the baseband chip to adjust the transmission power of the Wi-Fi antenna.

8. The mobile terminal of claim 5, wherein the network standard comprises at least one of a 2nd Generation (2G) network, a 3nd Generation (3G) network, or a 4nd Generation (4G) network.

9. A non-transitory computer storage medium having stored thereon a computer program that, when executed, performs steps of:
   monitoring a cell change or a network standard change of a mobile terminal;
   in response to that the cell change or the network standard change is monitored, acquiring an operating frequency band in which the mobile terminal currently camps; and
   adjusting a transmission power of a Wi-Fi antenna the operating frequency band and an SAR value reference table;
   wherein the SAR value reference table comprises: a pre-stored SAR value set, each pre-stored SAR value corresponding to an operating frequency of the mobile device; a difference value between a pre-stored SAR value corresponding to each operating frequency band and a SAR standard value; and a power adjustment value corresponding to the difference value between the pre-stored SAR value corresponding to each operating frequency and the SAR standard value.

10. The non-transitory computer storage medium of claim 9, wherein the mobile terminal further comprises at least one antenna for connecting to a cellular network, and when the computer program is executed, the computer program performs steps of:
    obtaining position information of a primary antenna of the at least one antenna;

obtaining a modified SAR value by modifying the pre-stored SAR value according to the position information; and adjusting the transmission power of the Wi-Fi antenna according to a difference value between the modified SAR value and the SAR standard value.

11. The non-transitory computer storage medium of claim 9, wherein when the computer program is executed, the computer program performs steps of:

in response to that the cell change is monitored, when the operating frequency band in which the mobile terminal currently camps is the same as an operating frequency band in which the mobile terminal previously camped, not adjusting the transmission power of the Wi-Fi antenna within the operating frequency band in which the mobile terminal currently camps.

12. The non-transitory computer storage medium of claim 9, wherein the network standard comprises at least one of a 2nd Generation (2G) network, a 3rd Generation (3G) network, or a 4th Generation (4G) network.

* * * * *